United States Patent

Brinkman

[15] 3,653,278
[45] Apr. 4, 1972

[54] TORSIONAL VIBRATION DAMPER HAVING INDEPENDENT WEIGHTS

[72] Inventor: Dale C. Brinkman, Washington, Ill.
[73] Assignee: Caterpillar Tractor Co., Peoria, Ill.
[22] Filed: Dec. 23, 1970
[21] Appl. No.: 101,020

[52] U.S. Cl. ..............................................74/574
[51] Int. Cl. ..............................................F16f 15/12
[58] Field of Search......................74/574; 188/1 B

[56] References Cited

UNITED STATES PATENTS 2,939,338  6/1960  Troyer......................................74/574
3,603,172  9/1971  Hall..........................................74/574

*Primary Examiner*—Milton Kaufman
*Assistant Examiner*—F. D. Shoemaker
*Attorney*—Fryer, Tjensvold, Feix, Phillips & Lempio

[57] ABSTRACT

A torsional vibration damper comprises a hub adapted to be attached to the crankshaft of an internal combustion engine. Inner and outer weights are rotatably mounted on the hub with the inner weight being mounted within a closed annular chamber formed by the outer weight. A shear inducing disc, attached to the hub, is positioned on each side of the inner weight in the chamber. The chamber is filled with a highly viscous fluid, such as silicone, for tuning and damping purposes.

14 Claims, 2 Drawing Figures

PATENTED APR 4 1972 3,653,278

INVENTOR
DALE C. BRINKMAN

BY
Fryer, Tjensvold, Feix, Phillips & Lempio
ATTORNEYS

TORSIONAL VIBRATION DAMPER HAVING INDEPENDENT WEIGHTS

BACKGROUND OF THE INVENTION

Torsional vibration dampers are widely used to dampen vibrations occasioned during operation of internal combustion engines. Such vibrations generate forces which tend to twist the engine's crankshaft and to subject attendant mechanisms to damage.

Various conventional dampers, such as the one disclosed in U.S. Pat. No. 3,234,817, have proven highly successful for damping and tuning purposes. However, space limitations and related considerations dictate the need for dampers exhibiting the highest possible performance characteristics per unit size.

SUMMARY AND OBJECTS OF THIS INVENTION

An object of this invention is to provide a noncomplex and economical torsional vibration damper which exhibits a high degree of structural integrity and high performance characteristics per unit size. The damper comprises a hub rotatable about a central axis thereof when attached to the crankshaft of an internal combustion engine. An annular outer weight is rotatably mounted on the hub and forms a closed chamber having an annular inner weight positioned therein which is also rotatably mounted on the hub. Shear inducing means are attached to the hub and positioned adjacent to the weights to provide the desired damping and tuning desiderata in conjunction with a viscous fluid which at least substantially fills the chamber.

BRIEF DESCRIPTION OF THE DRAWING

Other objects of this invention will become apparent from the following description and accompanying drawing wherein.

DESCRIPTION OF THE PREFERRED EMBODIMENT

Figure 1:
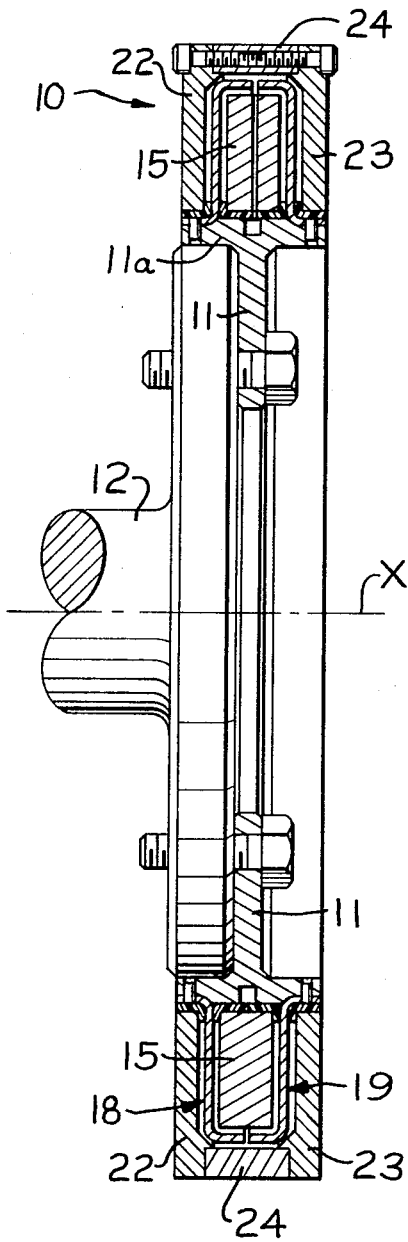
FIG. 1 is a cross-sectional view of a torsional vibration damper, embodying the present invention, attached to the crankshaft of an internal combustion engine.
Figure 2:
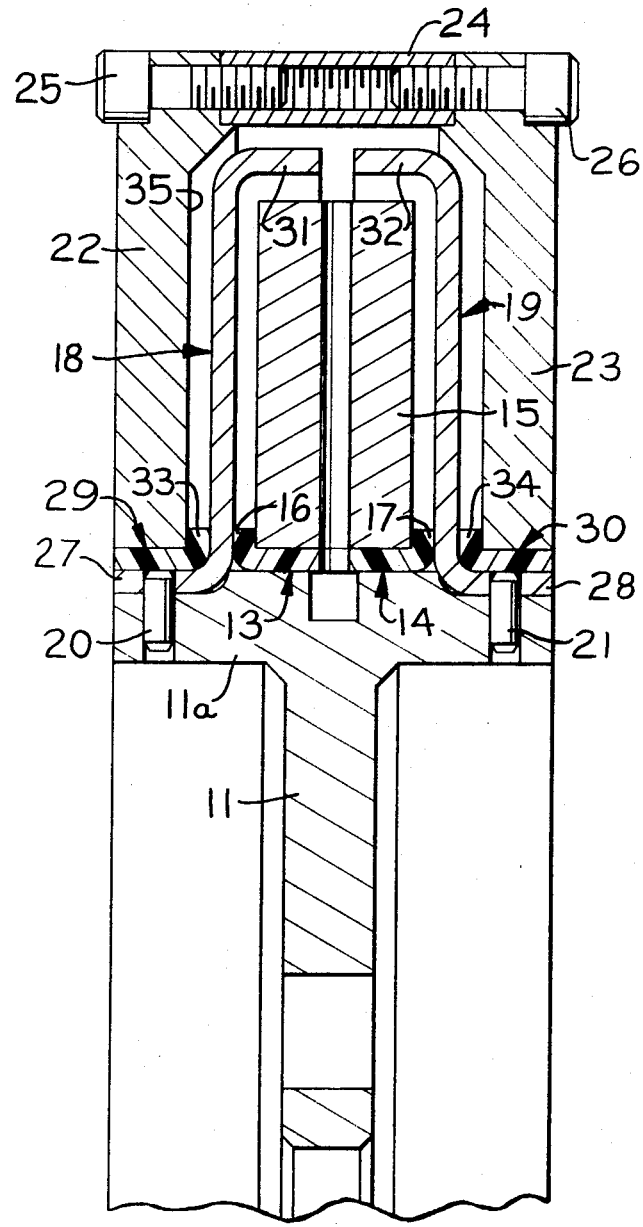
FIG. 2 is an enlarged, fragmentary view of the FIG. 1 damper.

Referring to the drawing, a torsional vibration damper 10 comprises an annular hub 11 suitably attached to an engine's crankshaft 12 for rotation about a central longitudinal axis X thereof. The tuned damper functions to dampen undesirable vibrations occasioned in an internal combustion engine or the like during crankshaft rotation. The hub has a flange 11a mounting a two part bearing bushing 13–14 thereon which in turn rotatably mounts a solid, annular or disc-shaped metallic inner weight 15.

The bearing parts have respective flanges 16 and 17 abutting opposite sides of the centrally located inner weight. Radial inner portions of shear inducing means or discs 18 and 19 abut such flanges to position and positively retain the inner weight axially. The discs may be attached to flange 11a of the hub by means of a plurality of radially disposed press-fit retaining pins 20 and 21, or by other suitable securing means.

An outer weight means of U-shaped cross-section comprises annular metallic weight members 22 and 23 and a radially outer cylindrical member 24 attached therebetween by means of radially disposed bolts 25 and 26. The annular and parallel weight members are rotatably mounted on flange portions 27 and 28 of the discs by means of bearing bushings 29 and 30, respectively. It should be noted that the discs further comprise flanges 31 and 32, disposed radially outwardly to substantially overlie the outer periphery of the inner weight. The latter flanges extend toward each other to further increase the effective shear inducing surface areas.

Bearings 29 and 30 comprise radially extending flanges 33 and 34, respectively, which cooperate with flanges 16 and 17 for sealing and weight centering purposes. Bearings 13, 14, 29 and 30 may comprise a conventional self-lubricating, low-friction, plastic bearing material such as Nylon or Teflon or other suitable metallic based bearing material. Alternatively, the plastic bearing material could be fully or partially coated on the inner and outer weights.

The symmetrically disposed outer weight means defines a closed chamber 35 having the inner weight and discs 31 and 32 positioned therein. Such chamber is at least substantially filled with a highly viscous fluid such as silicone having a viscosity greater than twenty million (20,000,000) centistokes, for example. The putty-like consistency of such silicone, as taught in U.S. Pat. No. 3,234,817, assigned to the assignee of this application, functions as an excellent tuning and damping medium. In addition, such a highly viscous fluid will not tend to leak out of chamber 35 as readily as a fluid having a substantially lower viscosity.

From the above description it can be seen that the damper of this invention is compact and affords very large shear inducing surface areas, as between the weights and discs 18 and 19. In addition, the outer weight is preferably of greater inertia than inner weight 15 or hub 11 and has a substantial portion thereof extending to a maximum radius radially past the hub. Also, driven discs 18 and 19 and hub 11 may be constructed of relatively lightweight material and kept within a relatively small radius with respect to rotational axis X to alleviate parasitic inertia, detrimental to damper operation.

It should be further noted that each of the weights exhibits at least three separate shear film areas relative to the discs or shear inducing means; namely, the radially extending portions of the discs and also flanges 31 and 32. In general, the outer weight increases effective inertia since it contains and encloses the visco elastic substance, discs 18 and 19 and the inner weight.

The outer weight also reduces parasitic inertia by eliminating the need for an outer cover or housing which is normally attached to the equivalent of hub 11. However, in certain damper applications such a housing could be connected to the hub to enclose the outer weight. A viscous fluid could be contained between the separate housing and outer weight to provide additional shear surface areas for tuning and damping purposes, if so desired.

What is claimed is:

1. A torsional vibration damper comprising
a hub arranged to rotate about a central axis thereof,
an annular outer weight means rotatably mounted on said hub,
means forming a closed chamber in said outer weight means,
an annular inner weight means rotatably mounted on said hub and positioned in said chamber,
a viscous fluid at least substantially filling said chamber, and
shear inducing means attached to said hub and positioned adjacent to said outer and inner weights.

2. The invention of claim 1 wherein said outer weights means has a U-shaped cross-section having inner surface portions defining said closed chamber.

3. The invention of claim 2 wherein said outer weight means is symmetrically disposed about said inner weight means and comprises a disc-shaped member positioned on each side of said inner weight means in the direction of said central axis and a cylindrical member attached between said disc-shaped members and positioned radially outwardly from said inner weight means relative to said central axis.

4. The invention of claim 1 wherein said inner weight means comprises a solid disc-shaped member centrally located on said hub in the direction of the central axis thereof.

5. The invention of claim 1 wherein said shear inducing means comprises at least one annular disc attached to said hub and disposed between said inner and outer weight means.

6. The invention of claim 5 wherein two of said annular discs are attached to said hub and are positioned on opposite sides of said inner weight means in the direction of said central axis.

7. The invention of claim 5 wherein said annular disc has a flange positioned radially outwardly from said inner weight means relative to an extending in the general direction of said central axis.

8. The invention of claim 6 wherein each of said annular discs has a flange positioned radially outwardly from said inner weight means relative to and extending in the general direction of said central axis, said flanges extending towards each other to substantially overlie the entire outer periphery of said inner weight means.

9. The invention of claim 1 wherein each of said inner and outer weight means are rotatably mounted on said hub by means of a bearing bushing.

10. The invention of claim 9 wherein each of said bearing bushings comprises a low-friction plastic material.

11. The invention of claim 10 wherein said bearing bushings each comprise at least one flange portion extending radially outward relative to said central axis and disposed between a respective one of said inner and outer weight means and said shear inducing means.

12. The invention of claim 1 wherein said viscous fluid has a viscosity of at least one million centistokes.

13. The invention of claim 1 where said viscous fluid has a viscosity of at least twenty million centistokes.

14. The invention of claim 13 wherein said viscous fluid is silicone.

* * * * *